Oct. 25, 1960     J. MALDONADO     2,957,405

FORMS FOR FRYING TORTILLAS FOR MAKING TACOS

Filed Dec. 29, 1958     2 Sheets-Sheet 1

INVENTOR.
JUVENCIO MALDONADO
BY
ATTORNEY

Oct. 25, 1960    J. MALDONADO    2,957,405
FORMS FOR FRYING TORTILLAS FOR MAKING TACOS
Filed Dec. 29, 1958    2 Sheets-Sheet 2
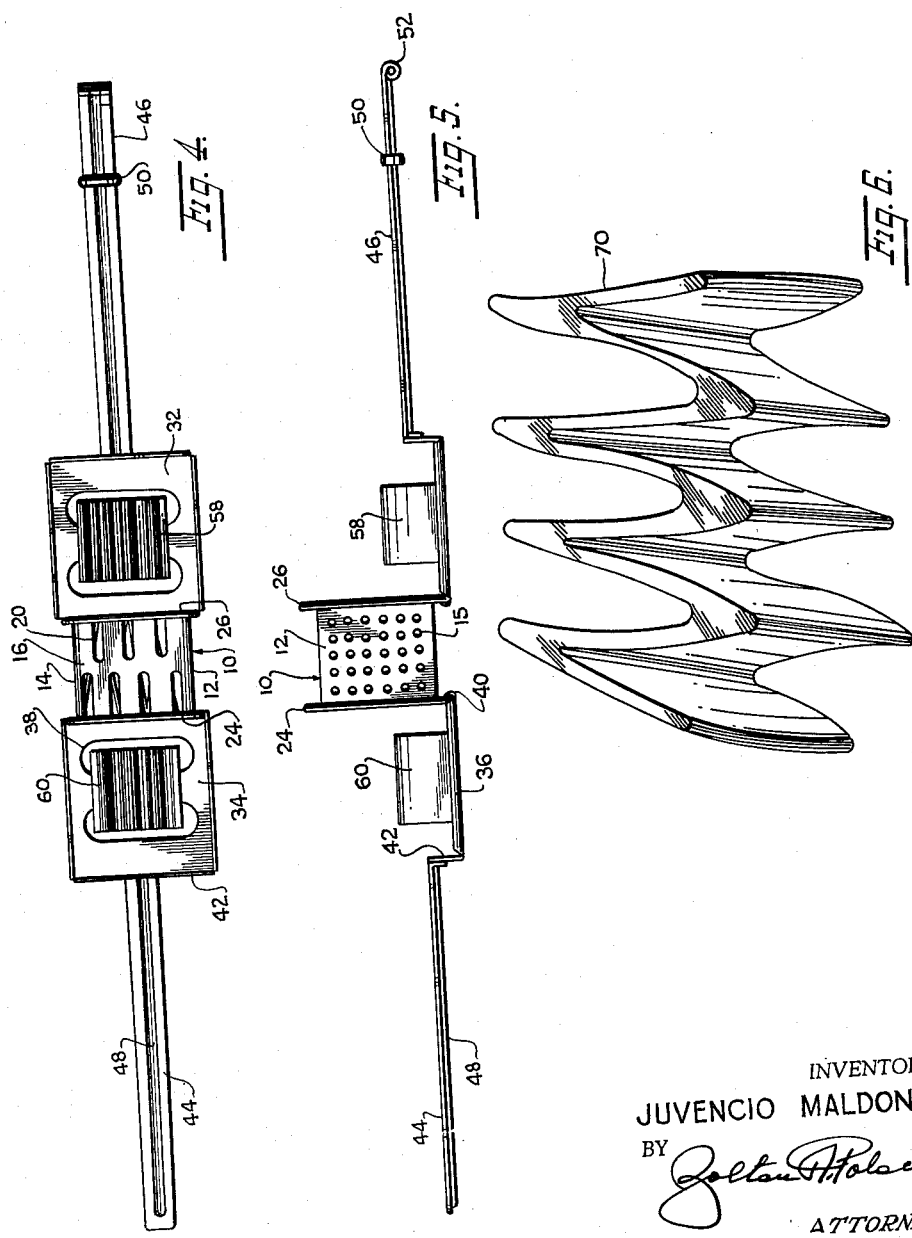
INVENTOR.
JUVENCIO MALDONADO
BY
ATTORNEY _United States Patent Office_

2,957,405
Patented Oct. 25, 1960

2,957,405
FORMS FOR FRYING TORTILLAS FOR MAKING TACOS

Juvencio Maldonado, 61 W. 46th St., New York, N.Y.

Filed Dec. 29, 1958, Ser. No. 783,446

1 Claim. (Cl. 99—426)

This invention relates to forms for frying tortillas for making tacos.

The invention comprises an improved form upon which a plurality of tortillas may be folded and locked in position and thereupon dipped in cooking fat or the like for a sufficient length of time to fry the tortillas, the frame thereafter being removed from the fat and the pieces of tortilla can be removed and filled with meat or other food and thereafter designated as tacos. The construction of the device includes a rectangular box or casing having a pair of open opposite ends. To the open ends are attached rectangular frames. A pair of perforated plates are pivotally attached to the respective frames. Handle members are attached to the several plates and are provided with a slidable ring for locking the handle members and plates in a closed position.

Within the casing is a vertically disposed zig-zag or reversely folded partition whose convolutions provide open-ended compartments in which tortillas are formed. On each of the plates are mounted similar reversely folded mold members whose ridges fit into the compartments defined by the partition in the case and are closely spaced from the walls of the partition to form the tortillas as thin-walled convoluted dough cakes.

The present invention provides means for producing tortillas with the requisite thin wall structure in a quick, efficient and uniform way.

It is therefore a principal object of the invention to provide a device for molding and frying a plurality of tortillas.

It is another object to provide a tortilla frying device provided with means for molding the tortillas with a predetermined convoluted thin wall structure.

A further object is to provide a device of the character described with improved means for loading the device with dough and with means for removing the fried tortillas conveniently.

Another object is to provide a tortilla frying device with improved cooking grease circulation and draining means.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 4 is a top plan view of the device in a fully open position.

Fig. 5 is a side elevational view of the fully open device.

Fig. 6 is a perspective view of a fried tortilla as made by the device embodying the invention.

Figure 2:
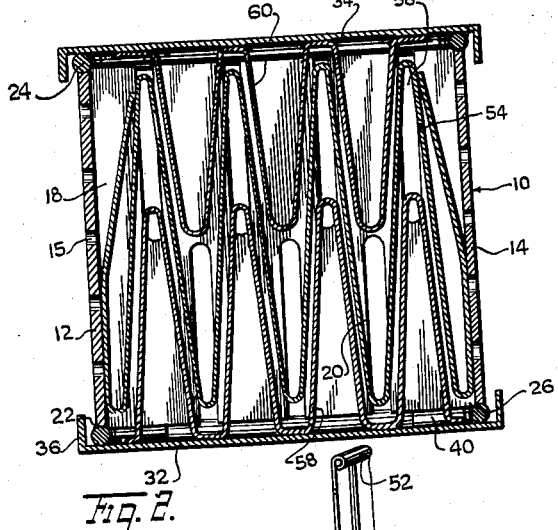
Fig. 2 is a sectional view taken on line 2—2 of Fig. 1.
Figure 3:
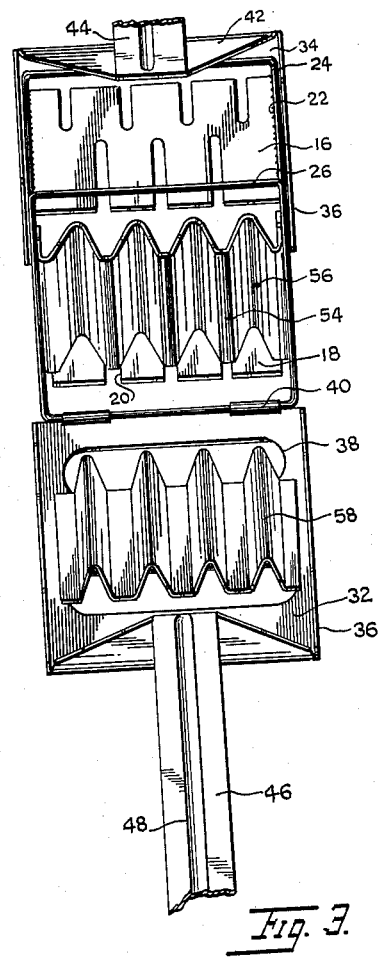
Fig. 3 is an oblique plan view of the device in a partially open position showing internal structure.
Figure 1:
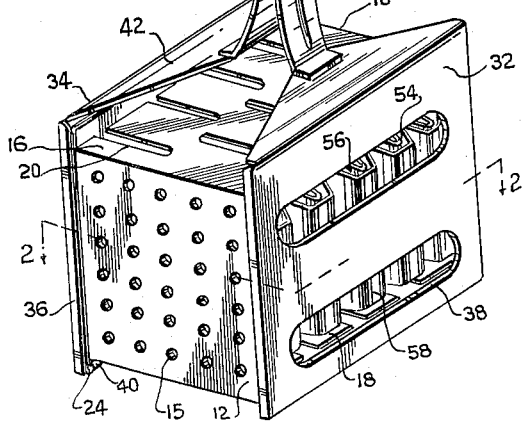
Fig. 1 is a perspective view of a device embodying the invention.

Referring to Figs. 1–5, there is shown a rectangular metal box or casing 10 formed with open ends. The casing has side walls 12, 14 formed with rows of holes 15. Top wall 16 and bottom wall 18 are each formed with slots 20 extending inwardly from the free edges of the walls. Secured to the rectangular open ends of the casing preferably by welds 22 are two rectangular frames 24, 26. These frames have their upper and lower ends spaced from the top and bottom walls 16, 18, respectively. To the bottom ends of the frames are pivotally attached rectangular end plates 32, 34. Each plate is formed with marginal inwardly turned flanges 36 and with transversely extending wide, elongated holes 38. Hinge leaves 40 are welded to the plates and are engaged on the bottom ends of the frames to permit free pivoting of the plates to open and closed positions. In Fig. 1 the device is shown in closed position. In Figs. 4 and 5 the device is fully open in position for placing dough thereon and for removing fried tortillas.

Welded to inwardly turned upper end flanges 42 of the plates are elongated handle strips 44 and 46. Each strip is reinforced by a ridge 48 formed therein. A ring 50 is slidably mounted on strip 46 for locking the handle members together in a closed position as shown in Fig. 1. Ring 50 is prevented from coming off of the strip 46 by the turned or curled end 52 of the strip.

Disposed within the casing and welded to opposite sides 12 and 14 is a reversely folded metal partition 54. The partition has a plurality of convolutions in order to provide a plurality of compartments 56. On the inner sides of the plates 32 and 34 are secured by welding, two ridged mold members 58, 60. Each of the mold members is formed from a reversely folded convoluted metal sheet in a manner similar to partition 54. The ridges are so formed on members 58 and 60 that they fit or nest into the compartments and are spaced slightly from the adjacent sides of the folded partition. Each of the mold members defines a reversely folded passage in which a convoluted tortilla 70 such as shown in Fig. 6 can be formed.

The several plates, mold members, partition and other parts of the device are preferably all made of stainless steel to insure that the device resists staining and corrosion in use and remains easily cleanable. The mold members and partition are formed of thin sheet steel. The walls of their convolutions are flexible. This is an important feature of the invention because it permits the mold members and the partition to expand inwardly away from each other while the dough expands slightly upon being fried. In the initial closed position the walls of the mold member and partition are close to each other so that the quantity of dough used in forming the tortilla is limited by the spacing of the adjacent walls of the compartments. During use, the entire device is inserted in a hot bath of cooking fat, oil or grease, so that the dough is fully cooked by the cooking fluid. While the tortilla is being cooked it expands somewhat and the walls of the partition and mold members yield or flex to permit the tortilla dough to expand.

When the tortillas are fully cooked or fried, the device can be extracted from the cooking grease and the handles can be unlocked to permit the plates 32, 34 to be opened to the position shown in Figs. 4 and 5. The tortillas can be easily removed from mold members. If the tortillas should remain on the partition 54 they can easily be lifted off. The device makes two convoluted tortillas in each cooking cycle.

The holes 15 in the sides of the casing and the slots 20 in the top and bottom of the casing as well as the holes 38 permit the cooking fluid to circulate through the device freely and to drain off readily when the device is lifted out of the cooking fluid. The vertical disposition of the compartments with their open top and bottom ends facilitates draining of cooking fluid.

When the device is in the open position as shown in Figs. 4 and 5, the dough in the form of a batter can be poured or brushed on the ridges of the mold members 58 and 60. Then the mold members loaded with batter can be fitted into the opposite sides of the partition 54 as the plates are pivoted to upright position. The ring 50 permits the handle members to be locked together and the entire assembly can then be immersed into the cooking fluid until the tortillas are fully cooked.

The device is easy to use, efficient, and sanitary. Its use insures uniformity in making tortillas and effects an economy in use of dough or batter since an excess of batter will drain out of the slots in the bottom of the casing before the device is inserted into the cooking or frying fluid.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A device for molding and frying two tortillas simultaneously, comprising a casing having flat side, bottom and top walls, said casing being formed with open opposite ends, a pair of rectangular frames secured to said open ends of the casing, each wall of the casing being formed with openings for circulating fluid through the casing and for draining the fluid therefrom, a reversely folded partition disposed in the casing and secured only at its ends between the side walls, said partition having convolutions defining two groups of compartments on opposite sides thereof, a pair of rectangular plates pivotally attached to said frames respectively, mold members secured to the plate respectively for fitting into the groups of compartments, said mold members being formed of sheet metal bent to form reversely folded convolutions shaped to fit into the compartments with a slight spacing between the convolutions of the partition and mold members, there being an elongated handle member attached to each of the plates, and means for detachably locking the handles together with said plates juxtaposed to the frames and said mold members nesting in said compartments, said partition and mold members being formed of flexible material so that the free portions intermediate the ends of said partition the sides of said compartments yield to permit tortillas on both sides of said partition to expand while being fried, the openings in the side walls being round holes and the openings in the top and bottom walls being elongated slots arranged in staggered formation, said plates being formed with elongated transversely extending wide holes to facilitate circulation of the fluid, said compartments having open ends so that said fluid is free to drain therefrom and through the slots in the bottom wall when the locked handles are held in a vertical position above the top wall of the casing so that the convolutions in said partitions and mold members are disposed vertically.

References Cited in the file of this patent
UNITED STATES PATENTS

| | | |
|---|---|---|
| 472,811 | Pickett et al. | Apr. 12, 1892 |
| 2,506,305 | Maldonado | May 2, 1950 |
| 2,570,374 | Pompa | Oct. 9, 1951 |
| 2,719,480 | Prickett et al. | Oct. 4, 1955 |